United States Patent [19]
Miller et al.

[11] 3,751,101
[45] Aug. 7, 1973

[54] VEHICLE SERVICING CART

[75] Inventors: Matthew N. Miller, Woodland Hills; Fred H. Seitz, Yorba Linda, both of Calif.

[73] Assignee: Fairchild Industries, Inc., Germantown, Md.

[22] Filed: Apr. 6, 1971

[21] Appl. No.: 131,730

[52] U.S. Cl. ............... 296/1 R, 186/1 R, 242/107.1, 242/107.14, 244/118 P, 248/361 A, 280/179 A
[51] Int. Cl. ............................................. B64d 11/04
[58] Field of Search ................ 296/1 R; 280/47.35, 280/179 A; 186/1 R, 1 D; 244/118 R, 118 P; 242/107, 107.1, 107.13, 107.15; 248/361 A; 105/368 T, 369 A

[56] References Cited
UNITED STATES PATENTS

| | | | |
|---|---|---|---|
| 3,179,208 | 4/1965 | Umanoff | 186/1 R |
| 3,517,899 | 6/1970 | Vernon | 244/118 R |
| 3,187,686 | 6/1965 | DePodesta | 105/368 T |
| 3,473,487 | 10/1969 | Blunden | 105/369 A |
| 539,654 | 5/1895 | Stewart | 242/107.13 X |
| 727,486 | 5/1903 | Sundin | 242/107.1 |
| 752,212 | 2/1904 | Estep | 242/107.13 |

*Primary Examiner*—Leo Friaglia
*Assistant Examiner*—Leslie J. Paperner
*Attorney*—Michael W. York

[57] ABSTRACT

A vehicle servicing cart adapted for use within a vehicle that has two separate cables for attachment to various stationary anchoring stations within the vehicle and separate reels for each cable that are rotatable relative to each other on a common shaft. The reels are adapted to normally be locked against each other and a cam is provided which upon actuation disengages the reels and permits relative rotation of the reels with respect to each other when the cables are to be extended or retracted. A resilient spring is provided that interconnects the reels and the spring is wound as the reels rotate when the cables are unwound from the reels in order to permit them to be attached to the anchoring stations. The spring acts upon the appropriate reel to cause it to rotate to wind its attached cable on the reel when the cable is detached from an anchoring station.

9 Claims, 7 Drawing Figures

INVENTORS
Matthew N. Miller
Fred H. Seitz
BY
Michael W. York
Attorney

PATENTED AUG 7 1973 3,751,101

INVENTORS
Matthew N. Miller
BY Fred H. Seitz

Michael W. York
Attorney 3,751,101

VEHICLE SERVICING CART

BACKGROUND OF THE INVENTION

With the advent of large transport vehicles and the increase in the serving of food and beverages to passengers using these vehicles, various types of food and beverage service carts have been devised and used to permit the serving of food and beverages to large numbers of passengers in a quick and efficient manner. This means of dispensing food and beverages has become quite popular with the vehicle operators and passengers and has been acknowledged to have contributed greatly to the attractiveness of the various modes of travel in which such services are offered to passengers. With the ever increasing popularity of such services and the resultant increased demand for such services, the service carts themselves have become more elaborate and sophisticated. In some cases these carts have become a part of an overall food service system for aircraft as indicated in U.S. Pat. No. 3,517,899. Other types of servicing carts have come into wide usage in aircraft used for high density quick turnaround "shuttle" runs between major cities, where carts are utilized in the collection of fares and dispensing of tickets to passengers already on the aircraft, so that passengers may board these aircraft with ease and convenience and without making previous ticket arrangements.

Generally, all of these servicing carts are provided with wheels or castors and are of such a dimension as to permit their use in the aisles of the vehicle between the rows of passenger seats so that food and beverages or tickets can be dispensed to the individual passengers with ease and convenience and with great rapidity. While the mobility of these carts within the aisles is of necessity a requirement to their usefulness, this very feature can and does constitute a serious hazard when the vehicle is in motion. As an example, if a vehicle is braked or accelerated or if it should encounter some turbulance during its operation, the cart could in effect become a missile within the vehicle and pose a serious threat to the structural integrity of the vehicle as well as the vehicle occupants.

To meet this problem, some of these servicing carts have been equipped with braking systems so that the wheels or castors will be locked or removed from rolling contact with the vehicle floor and while these braking systems are effective to a limited degree, they cannot be entirely relied upon in more violent or abrupt situations. The present invention overcomes these problems and the vehicle servicing cart of the present invention has means to secure the cart to a variety of fixed anchoring points within the vehicle.

SUMMARY OF THE INVENTION

This invention relates to vehicle servicing carts and more particularly to vehicle servicing carts that are suitable for use within a vehicle by passenger attendants for dispensing food or beverages or for providing services to passengers in various types of vehicles.

It is an object of the present invention to provide a vehicle servicing cart that can be secured at various locations within a vehicle.

It is an object of the present invention to provide a vehicle servicing cart that is capable of being used to safely and rapidly provide services to passengers within a vehicle.

It is another object of the present invention to provide a vehicle servicing cart that can be anchored within a vehicle to prevent the servicing cart from being thrown about within the vehicle when the vehicle is subjected to abrupt movements.

The present invention provides a vehicle servicing cart system for use within a vehicle including a servicing cart having a cart body, means operatively connected to the cart body for permitting the servicing cart to be moved within the vehicle, and an elongated flexible member operatively connected to the servicing cart body. In addition, anchoring means located within the vehicle for permitting the elongated flexible member to be anchored within the vehicle, storage means operatively connected to the servicing cart body for storing at least a portion of the elongated flexible member and means associated with the storage means for permitting at least a portion of the elongated flexible member to be removed from the storage means and extended from the servicing cart are also provided.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
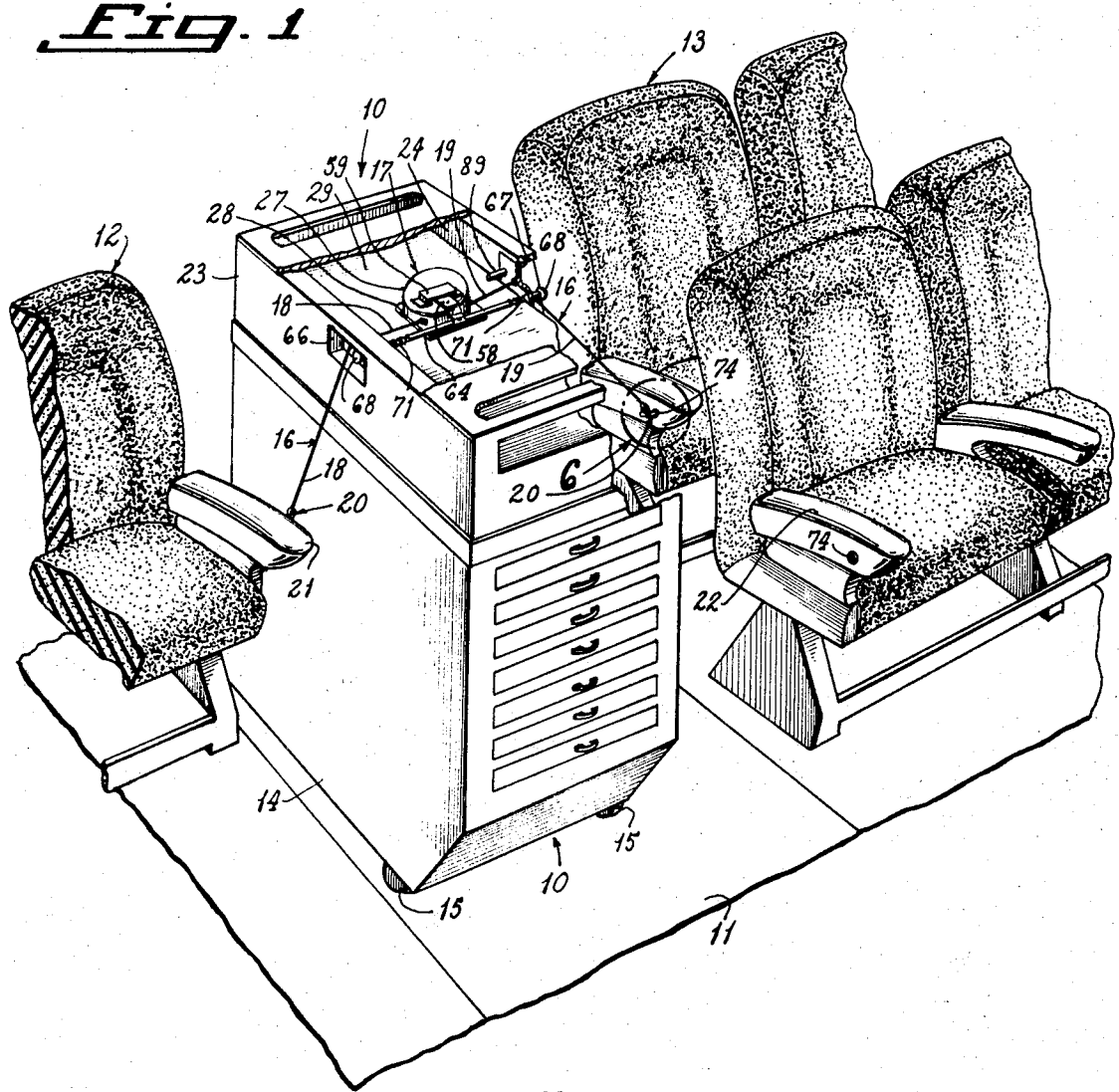
FIG. 1 is a perspective view of the vehicle servicing cart of the present invention depicted in operation within the aisle of a passenger vehicle.

If reference is made to FIGS. 1 through 5 in the drawings, it will be noted that the vehicle servicing cart of the present invention is generally designated by the reference number 10 and is shown in use within an aisle 11 formed between rows of passenger seats 12 and 13 in the passenger compartment of a vehicle. The vehicle servicing cart 10 comprises a generally rectangular shaped servicing cart body 14 that is supported by means operatively connected to the servicing cart body comprising a plurality of castors 15 that permit the servicing cart body to be moved about within the vehicle so that the seat occupants can be conveniently serviced from the cart by a vehicle cabin attendant. Connecting means designated generally by the number 16 are operatively connected to the servicing cart body 14 for permitting the servicing cart body to be secured at various locations in the aisle 11 in the interior of the vehicle.

Storage means designated generally by the number 17 are also operatively connected to the servicing cart body 14 for storing a portion of the connecting means 16 when the connecting means is not in use. The connecting means 16 comprises two elongated flexible members that comprise cables 18 and 19 that have attachment means 20 at their respective outer ends that are adapted to attach the outer ends to respective outer armrests 21 and 22 of the aisle seats at various locations in the aisle 11 of the vehicle. The cables 18 and 19 pass through apertures in the respective side walls 23 and 24 of the cart body 14 and a portion of the respective cables 18 and 19 are wound around respective reels 26 and 25 that form part of the storage means 17. The storage means 17 also includes a reel housing 27 that houses the reels 25 and 26 and the reel housing has a mounting flange 28 situated at its base that is rigidly secured to a horizontal panel 29 in the upper portion of the cart body 14.

If particular reference is now made to FIGS. 2 through 5 of the drawings, it will be noted that the reel housing 27 comprises a base member 30 and an upper member 31 that has a skirt 32 that encircles an upright portion of the base member that is slightly smaller in diameter than the skirt. The aforementioned mounting flange 28 comprises an upper flange 33 extending from the base of the skirt 32 and a lower flange 34 located at the base of the base member 30. Both the upper and lower flanges 33 and 34 have respective matching holes near their corners that are adapted to receive mounting bolts 35 that serve to hold the upper member 31 and lower base member 30 of the reel housing 27 together as well as fasten the housing to the panel 29 of the servicing cart 10. Both the upper member 31 and the base member 30 of the reel housing 27 have centrally disposed holes 36 and 37 respectively, which accommodate the ends of a shaft 38.

The cable reel 26 is rotatably mounted on the shaft 38 within the upper member 31 of reel housing 27 and accommodates a portion of the cable 18 that is wound around the periphery of the cable reel. The periphery of cable reel 26 is also provided with cable retaining flanges 39 which are of slightly larger diameter than, and situated on both sides of, the peripheral surfaces of the reel on which the cable 18 is wound to maintain the cable windings on the reel.

Figure 2:
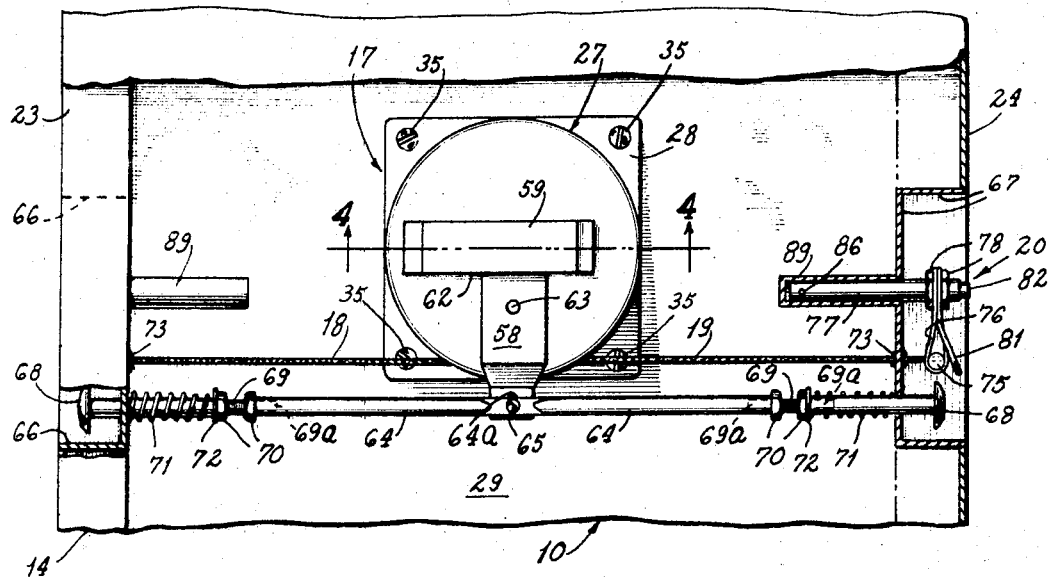
FIG. 2 is a top plan view of the connecting and storage means that forms part of the vehicle servicing cart of the present invention.
Figure 3:
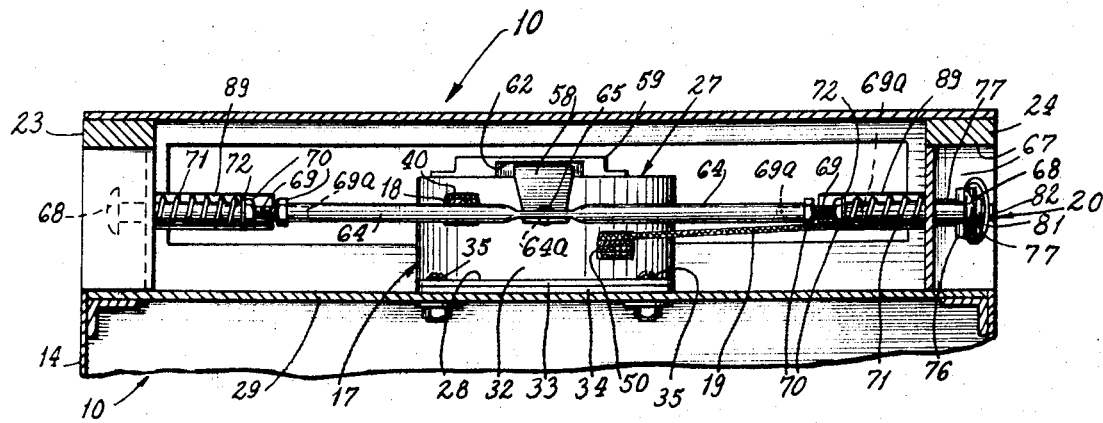
FIG. 3 is a front elevational view of the structure illustrated in FIG. 2.

The cable 18 may have one of its ends fastened to the reel 26 in any well known manner and the cable should be of sufficient length and be wound about the reel a sufficient number of times to permit the cable when it is unwound from the reel to reach a variety of desired anchoring points within the vehicle. An aperture 40 is provided in the skirt 32 of the upper member 31 of housing 27 to permit the cable 18 to extend from the reel through the housing as best seen in FIGS. 2 and 3 of the drawings.

Figure 4:
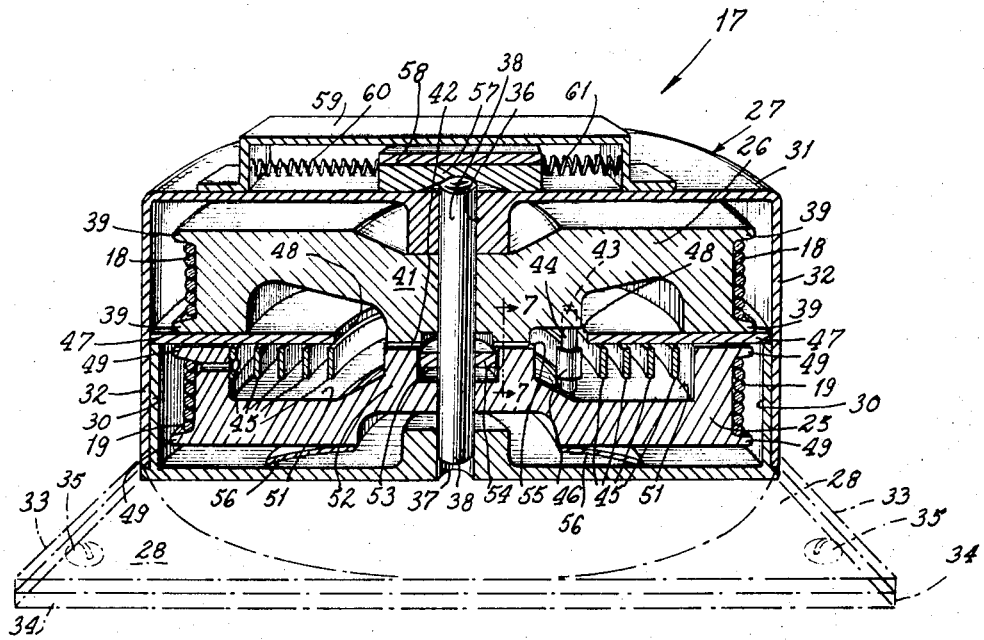
FIG. 4 is a perspective sectional view taken on the line 4—4 of FIG. 2, illustrating the storage means that forms part of the vehicle servicing cart of the present invention in its normal locked condition.
Figure 5:
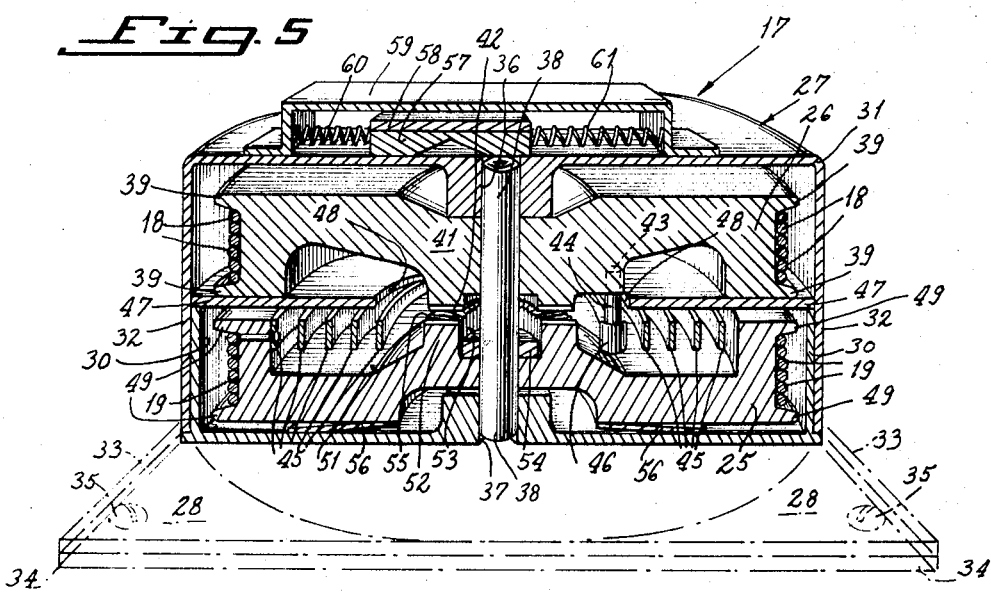
FIG. 5 is a perspective sectional view of the structure illustrated in FIG. 4, but illustrating the storage means that forms part of the vehicle servicing cart of the present invention in its unlocked condition.

As illustrated in FIGS. 4 and 5, the central or hub portion 41 of the cable reel 26 which surrounds the shaft 38, upon which the reel 26 is rotatably mounted, is of substantial thickness and has a plurality of radially extending sawteeth 42 on the lower surface of the reel hub 41 and a hole 43 is provided in the lower surface of the reel hub that receives one end of an anchoring pin 44 which depends therefrom and serves to anchor one end of a spirally wound flat spring 45. The spring 45 is mounted on the anchoring pin 44 by means of a loop 46 which is formed at one end of the spring to circle the anchoring pin 44 and yet maintaining its ability to move vertically on the pin under circumstances which will be hereinafter described.

A disc 47 is also situated within the reel housing 27 and fits snugly within the skirt 32 of the upper member 31 of the reel housing and it rests upon the edge of the upright portion of the base member 30 of the housing. This disc 47 maintains the cable reel 26 within the upper member 31 of the housing 27 and prevents vertical displacement of the cable reel 26 while permitting its rotation about the shaft 38. The disc 47 is also provided with a central opening 48 and the aforementioned shaft 38, spring anchoring pin 44, and the hub 41 of cable reel 26 that has the radially extending sawteeth 42 on its lower surface extend through this central opening.

The base member 30 of the reel housing 27 contains the second cable reel 25 which is situated beneath the disc 47 and is rotatably mounted on the shaft 38. In a manner similar to that previously described with respect to the upper cable reel 26, the second cable 19 is wound about the periphery of the lower cable reel and is fastened to the lower cable reel 25. However, in this instance the cable 19 is wound upon the reel 25 in a direction opposite to the aforementioned tether cable 18 so that the tether cables 18 and 19 extend from their respective cable reels 26 and 25 in opposite directions. In a manner similar to that already described with respect to the cable reel 26, the lower cable reel 25 is provided with cable retaining flanges 49 which are of slightly larger diameter than, and situated on both sides of, the peripheral surface of the reel 25 upon which the cable 19 is wound to maintain the cable windings on the reel. The reel housing 27 is likewise provided with an aperture 50, as best seen in FIG. 3, which will permit the cable 19 to extend from the reel 25 through the housing 27 in an opposite direction to that of the cable 18, as already mentioned.

It will be noted that the second cable reel 25 has a somewhat different configuration than the upper cable reel 26 in that a sizeable cavity 51 is provided between its hub portion 52 and peripheral rim of the reel upon which the cable 19 is wound. This cavity 51 accommodates the aforementioned spirally wound flat spring 45 and the anchoring pin 44 which is fastened to the upper cable reel 26. The spiral spring 45 is progressively wound from the anchor pin 44 outwardly around the hub 52 and the other outer end of the spring is fixed to the inner surface of the peripheral wall of the reel 25 within the cavity 51, so that a resilient connection is provided by means of the spring 45 between the upper cable reel 26 and the second cable reel 25, as illustrated in FIGS. 4 and 5 where the spring is shown in its relaxed position.

The hub 52 of the cable reel 25 also has a somewhat different configuration in that it has a recess 53 adjacent to the shaft 38 to accommodate a collar 54 that is fixedly mounted on the shaft. This collar 54 is adapted to exert a downward force on the hub 52 of the cable reel 25 under certain operating conditions which will be hereinafter further described. In addition, the upper surface of the hub 52 of the cable reel 25 immediately adjacent the recess 53, is provided with a plurality of radially extending sawteeth 55 which, under certain conditions to be described, cooperate with the previously described sawteeth 42 situated on the opposing surface of the hub 41 of the upper cable reel 26, as best illustrated in FIGS. 4 and 5 of the drawings. The cooperative relationship of the saw-teeth 42 and 55 on the respective cable reels 26 and 25 can be maintained through the action of a "belleville" spring 56, which is situated between the base member 30 of the housing 27 and the lower surface of the cable reel 25 and which can exert an upward force upon this lower cable reel.

If particular reference is made to FIGS. 4 and 5, it will be noted that the upper end of the shaft 38 is rounded and adapted to be acted upon by a cam 57 provided on the underside of a cam actuating lever 58. The cam 57 is situated within a rectangular cam housing 59 that is fastened to the upper surface of the cable reel housing 27 and is urged toward a neutral position by resilient means comprising springs 60 and 61 disposed on either side of the cam 57 between the cam and the cam housing 59. The cam actuating lever 58 extends through a slot 62 in the side of cam housing 59 (FIG. 3) and is pivotally mounted on the cable reel housing 27 by means of a fulcrum pin 63. The lever 58 is offset to facilitate its connection to an actuator rod 64 and the actuating lever has a slot 64a, through which a fastening pin 65 passes, to connect the actuator rod to the actuating lever as will be noted in FIGS. 2 and 3 of the drawings.

The actuator rod 64 extends laterally through both sides 23 and 24 of the mobile servicing cart body 14 and recesses 66 and 67 are provided in the respective sides as best illustrated in FIG. 2 so that the actuating rod does not protrude beyond the limits of the cart body in order that any dangerous protuberance from the cart can be avoided. Both outer ends of the actuator rod 64 that are accessible from the outside of the cart are fitted with actuating buttons 68 for the convenient use of the servicing cart attendant from either side of the cart 10. The actuator rod 64 is equipped with adjustment links 69 which are disposed between and threadably engaged with tubular and internally threaded sections 69a of the actuating rod and are held in position by locknuts 70. The actuator rod 64 may thereby be lengthened or shortened or its position adjusted to compensate for variations in the servicing cart frame and to provide suitable adjustment means to attain a neutral position for the rod 64, lever 58 and cam 57. In addition, both outer ends of the actuating rod 64 are provided with centering springs 71 which encircle the outer ends of the actuator rod 64 and bear against the servicing cart wall 23 or 24 and against a washer 72 that is disposed around each adjusting link 69, adjacent the outer locknut 70. By means of this arrangement the actuating rod 64 and cam actuating lever 58, as well as the cam 57, are continuously biased toward a central or neutral position which corresponds to that position shown in FIG. 4.

As previously mentioned, the tether cables 18 and 19 extend from the cable reel housing 27 in opposite directions and pass through the respective side walls 23 and 24 of the cart body 14. Anti-chafing grommets 73 are provided, one in each side wall 23 and 24 of the cart body 14, through which the respective cables 18 and 19 are directed and these grommets permit the repeated extension and retraction of the cables without undue deterioration or fraying of the cables and as well aid in distributing various loads which might be imposed on the cables at the points where the cables pass through the walls of the cart body.

Figure 6:
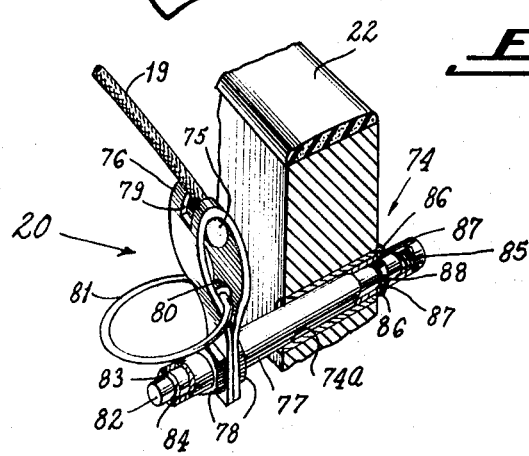
FIG. 6 is an enlarged view partly in section of the attachment means that forms part of the vehicle servicing cart of the present invention taken within the circle 6 of FIG. 1.

As heretofor mentioned, each cable 18 and 19 is provided with attachment means generally designated by the number 20 and best illustrated in FIG. 6. These attachment means 20 are adapted to cooperate with anchoring stations 74 comprising sockets 74a which are provided in each of the passenger seat armrests such as the armrests 21 and 22 which border the aisle 11. Each attachment means 20 comprises a cylindrical cable end member 75 which is swaged on the outer end of each cable 18 and 19. The attachment means 20 also includes a hollow teardrop shaped member 76 and the cylindrical cable end member 75, associated with each of the cables 18 and 19, are fitted and capable of some rotation within the enlarged portion of the teardrop shaped member 76, which is in turn held in position on a sleeve 77 by two locknuts 78. The enlarged portion of the teardrop shaped member 76 is also provided with a slot 79 to permit passage of the cable 18 or 19, while the area immediately adjacent the locknuts 71 is formed to provide a hinged attachment point 80 for a rotatably mounted pull ring 81. A reciprocable locking pin 82 is fitted within the sleeve 77 and is held within the sleeve by a lip 83 formed on its outer end which cooperates with a shoulder 84 formed on the outer surface of the locking pin 82. The locking pin 82 is biased against the lip 83 by means of a compression spring 85 which is disposed between the inner end of the locking pin and the closed end of the sleeve 77. A plurality of ball locks 86 are situated about the locking pin 82 and a portion of each ball lock extends through an aperture 87 near the inner end of the sleeve 77 when the locking pin is in its normal at-rest position. The locking pin 82 is, however, provided with a V-shaped peripheral groove 88 that will accommodate and receive the ball locks 86 when the locking pin is depressed by putting pressure on the outer end of the locking pin to compress the spring 85.

This locking pin 82, sleeve 77 and the ball locks 86 are adapted to cooperate with the aforementioned sockets 74a when the cables are attached to the anchoring stations 74. The sleeve 77 is adapted to be insertable into the socket 74a when the locking pin 82 is depressed so that the ball locks 86 can be received within the groove 88 and once the sleeve is within the socket and the locking pin is released the ball locks are forced outward into the apertures 87 and the extended ball locks 86 bear against the inner edge of the socket 74a and this prevents the locking pin/sleeve assembly from being removed from the socket unless the locking pin is depressed to permit the ball locks to move into the peripheral groove in the locking pin.

As illustrated in FIG. 2, the attachment means 20 including the pin 82, sleeve 77, and the ball locks 86 can be conveniently stored when not in use by inserting the sleeve into hollow receptacles 89 that are provided in the side walls 23 and 24 of the cart body 14.

The vehicle servicing cart 10 of the present invention is conveniently operated by the cart attendant who can remove the attachment means 20 by grasping the pull ring 81 with one finger, while depressing one of the actuator buttons 68 and withdrawing the attachment means from its receptacle 89 in the cart side wall 23 or 24. After the attachment means 20 connected to the end of the appropriate cable 18 or 19 has been removed from its storage receptacle 89, the attendant continues to depress or again depresses one of the actuating buttons 68. The most convenient actuating button 68 to depress is the one located nearest the attachment means 20 which is withdrawn from its receptacle. When the actuating button 68 is depressed, this causes actuator rod 64 to move in the direction in which the button has been depressed against the force of whichever centering spring 71 that has been compressed by the movement of the actuator rod. As the rod 64 is moved in either direction its motion is transmitted to the cam actuating lever 58 to which it is attached. The lever 58 is thereby moved about the fulcrum provided by the pin 63, causing the cam 57, carried by lever 58, to be moved accordingly, in either direction, against the force of either of the cam spring 60 or 61, away from the neutral or center position. As this occurs, the cam 57 acts upon the rounded end of the shaft 38 and causes the shaft to move in a downward direction from the position shown in FIG. 4 of the drawings to that shown in FIG. 5.

As the shaft 38 is moved in a downward direction, the collar 54, fixed to the shaft, exerts a downward force on the portion of the hub 52 that has the recess 53, against the force of the "belleville" spring 56. As the cable reel 25 moves downwardly, the sawteeth 55 on the hub 52 of the lower cable reel 25 are disengaged from the sawteeth 42 on the upper cable reel 26. As the lower cable reel 25 is so moved, the spirally wound spring 45, situated within the cavity 51 of the cable reel 25, is also moved downwardly since it is connected to the cable reel. The downward movement of the spring is facilitated by the ability of the loop 46 to adjust its position on the anchoring pin 44. In this condition, the upper and lower cable reels 25 and 26, as previously indicated, are no longer positively engaged through their sawteeth but are resiliently connected through the medium of the aforementioned spirally wound spring 45. Relative motion between the reels 25 and 26 is thereby permitted so that as one cable 18 or 19 is withdrawn from its respective reel, the spiral spring 45 will be more tightly wound. Consequently, as the service cart attendant depresses the actuating button 68 and withdraws the cable 18 or 19 from its respective cable reel 26 or 25, the sprial spring 45 will be wound to maintain the withdrawn cable under tension. It should be noted that this occurs automatically as the servicing cart attendant maintains pressure on the actuating button 68 with one hand while withdrawing the cable 18 or 19 from the reel 26 or 25 and inserts the attachment means 20 into the nearest socket 74a of the anchoring station 74, while the pin 82 of the attachment means 20 is held in the depressed position within the sleeve 77. When the sleeve 77 and pin 82 have been inserted in the anchor socket 74a as far as the structure permits, finger pressure on the locking pin 82 may be relaxed, whereupon the compression spring 85 will force the locking pin shoulder 84 against the sleeve lip 83 and the pin 82 will drive the ball locks 86 outwardly through the apertures 87 in the sleeve. In their outermost position the ball locks 86 extend beyond the outer circumference of the sleeve 77 and engage the inner end of the socket 74a of an anchoring station 74. In this manner, the attachment means 20 will be securely attached to the anchoring station 74.

At this point, the service cart attendant may release the pressure on the actuating button 68, whereupon the compressed centering spring 71, associated with the actuator rod 64 together with whichever of the cam springs 60 or 61 had been compressed, will act to restore the rod and cam 57 to its neutral position shown in FIG. 4. As this occurs, the "belleville spring" acts in an upward direction upon the lower reel 25 and the reel hub 52 in turn acts upon the collar 54 attached to the shaft 38 and causes the entire assembly to move to its uppermost position corresponding to that shown in FIG. 4 of the drawings; whereupon the sawteeth 55 and 42 on the respective cable reels 25 and 26, will be re-engaged, and the locking relationship of one reel with the other will be re-established.

The service cart attendant may then repeat this cycle on the opposite side of the servicing cart 10 by withdrawing the respective attachment means 20 from its receptacle 89 in the previously described manner, depressing the nearest actuator button 68 while withdrawing the respective cable 18 or 19 from the other reel 25 or 26 and inserting and locking the attachment means 20 within a socket 74a at an anchoring station 74 on the opposite side of the aisle 11. During this process, the spirally wound spring 45 within the cavity 51 will be wound more tightly and will maintain both of the cables 18 and 19 under tension while the second cable is being attached to its respective anchoring station 74. When both cables 18 and 19 have been attached and the actuator button 68 is released by the cart attendant, the sawteeth 42 and 52 are re-engaged, causing the cable reels 25 and 26 to lock against each other and prevent any further unreeling of the cables. It is noted that in this condition the servicing cart 10 is securely fastened in position in the aisle 11 of the vehicle. It should also be noted that the servicing cart 10 utilizing the cable system of the present invention may be moved within a distance corresponding to the length of the cable to the extent permitted by the particular spirally wound spring 45 that is selected for a given installation. That is to say that the cart attendant may, be depressing the actuator button 68, proceed to move the servicing cart 10 along the length of the cables 18 and 19 even though the cables are attached to the anchoring stations 74. Of course, the extent that such movement would be possible would also be determined by the winding ability of the spiral spring 45.

When the cart attendant wishes to disconnect the cables 18 and 19, the reverse sequence may be followed on each side of the service cart 10. The attachment means 20 on one side is first removed by grasping the pull ring 81 and depressing the locking pin 82 within its sleeve 77, permitting the ball locks 86 to fall into the V-shaped peripheral groove 88 and out of locking engagement with the inner end of socket 74a in the anchoring station 74. The attachment means 20 may then be easily withdrawn from the socket 74a while the actuator button 68 is depressed to disengage the locking relationship of the cable reels 25 and 26 through their sawteeth 55 and 42, as previously described, permitting the wound spiral spring 45 to rotate the respective cable reel 25 or 26 to retract the respective cable 18 or 19. The attendant may then store the attachment means 20 to the storage receptacles 89 provided in the service cart.

Figure 7:
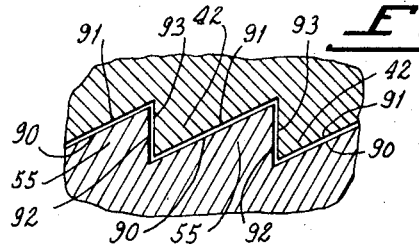
FIG. 7 is an enlarged broken sectional view taken on the line 7—7 of FIG. 4.

As illustrated in FIG. 7, if the spiral wound spring 45 is strng enough in relation to the strength of the "belleville" spring 56 and the sawteeth 55 and 42 have respective sloping edges 90 and 91 that are in slidable contact with each other when the cable reels 25 and 26 are in contact with each other as either cable reel 25 or 26 tends to rotate to retract the respective cable 18 or 19, then it will not be necessary to depress either actuator button 68 to cause either cable reel to rotate to retract its attached cable since the force of the spiral wound spring 45 will overcome the force of the "belleville" spring 56 that is keeping the teeth of the respective reels meshed together and thus the sloping edges 90 and 91 of the teeth will ride over each other and the appropriate reel will rotate to rewind its cable. It should be noted that it will still be necessary to depress one of the actuator buttons 68 in order to unreel either cable 18 or 19 since the perpendicular edges 92 and 93 of the respective teeth 55 and 42 engage each other and prevent rotation of either reel to unwind its cable, if either actuator button is not depressed, when an attempt is made to unreel either cable from its respective reel.

Although the invention has been described in considerable detail with reference to certain preferred embodiments, it will be understood that variations and modifications may be made within the spirit and scope of the invention as defined in the appended claims.

What is claimed is:

1. A vehicle servicing cart system for use within a vehicle comprising a servicing cart having a cart body, means operatively connected to said servicing cart body for permitting said servicing cart to be moved within said vehicle, an elongated flexible member operatively connected to said servicing cart body, means located within said vehicle for permitting said elongated flexible member to be anchored within said vehicle, storage means operatively connected to said servicing cart body for storing at least a portion of said elongated flexible member and means associated with said storage means for permitting at least a portion of said elongated member to be removed from said storage means and extended from said servicing cart, said means for permitting removal of at least a portion of said elongated flexible member including means for permitting limited controlled movement of said servicing cart while said elongated flexible member is anchored within said vehicle by said anchoring means.

2. A vehicle servicing cart system for use within a vehicle comprising a servicing cart having a cart body, means operatively connected to said servicing cart body for permitting said servicing cart to be moved within said vehicle, a first reel operatively connected to said servicing cart body, a first elongated flexible member having at least a portion thereof wound on said first reel, a second reel operatively connected to said servicing cart body a second elongated flexible member having at least a portion thereof wound on said second reel, means associated with said reels for controlling the extent of the unwinding of said elongated flexible members from said reels, and means located within said vehicle for permitting said elongated flexible members to be anchored within said vehicle.

3. The vehicle servicing cart system of claim 2 wherein said anchoring means comprise means for permitting the outer end portions of said elongated flexible members to be anchored within said vehicle.

4. The vehicle servicing cart system of claim 3 wherein said vehicle has seats and wherein said anchoring means are connected to at least some of said seats.

5. The vehicle servicing cart system of claim 3 wherein the outer end portions of said elongated flexible members have attachment means for attaching the outer end of each of said elongated flexible members to said anchoring means and further comprising means located on said servicing cart for storing said attachment means when said attachment means are not in use.

6. The vehicle servicing cart system of claim 3 wherein said means for controlling the extent of the unwinding of said elongated members from said reels comprises means for locking said reels together to prevent relative rotation of said reels.

7. The vehicle servicing cart system of claim 6 wherein said locking means comprises a spring biasing one reel toward the other.

8. The vehicle servicing cart system of claim 3 further comprising resilient means operatively connected to said reels for applying tension to said reels as said reels are rotated to unwind said elongated flexible members.

9. The vehicle servicing cart system of claim 8 wherein said means for applying tension to said reels comprises a spring.

* * * * *